Dec. 22, 1925.
P. A. SINGER
DEVICE FOR TREATING MATERIAL
Original Filed Sept. 22, 1922
1,566,623
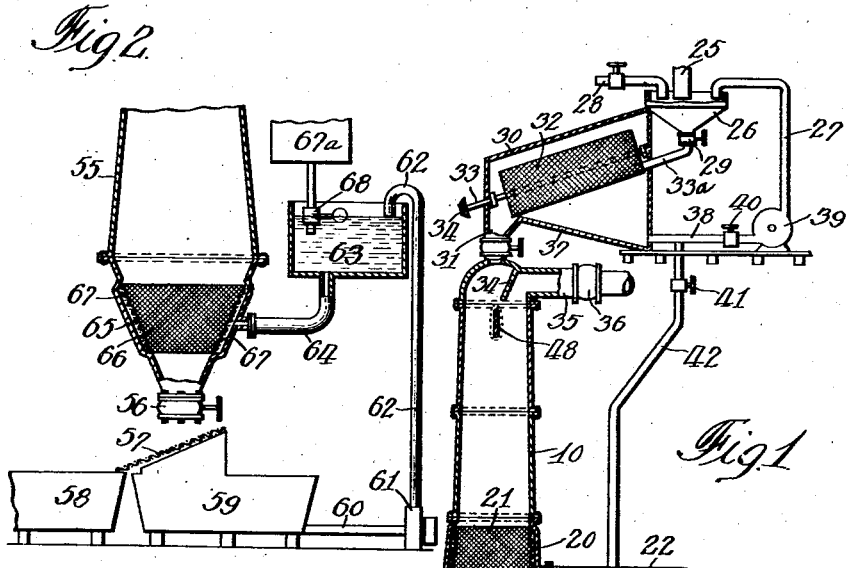
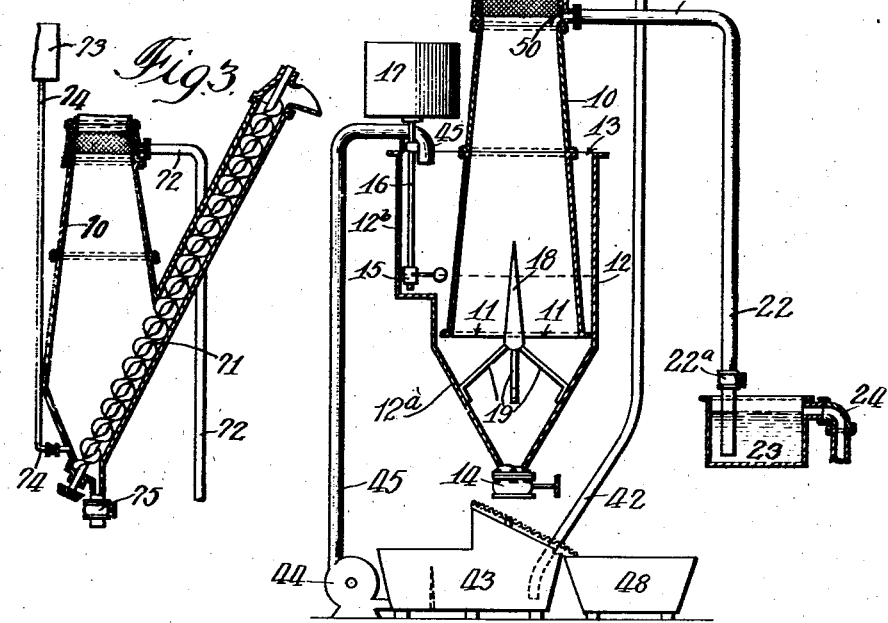
Inventor:
Philip A. Singer
By Luther Johns Atty.

Patented Dec. 22, 1925.

1,566,623

UNITED STATES PATENT OFFICE.

PHILIP A. SINGER, OF GLEN ELLYN, ILLINOIS.

DEVICE FOR TREATING MATERIAL.

Original application filed September 22, 1922, Serial No. 589,954. Divided and this application filed September 12, 1924. Serial No. 737,225.

*To all whom it may concern:*

Be it known that I, PHILIP A. SINGER, a citizen of the United States, residing at Glen Ellyn, Du Page County, Illinois, have invented certain new and useful Improvements Relating to Devices for Treating Material, of which the following is a specification.

This application is a division of my co-pending and allowed application known as Serial No. 589,954, filed September 22, 1922 entitled Methods for treating material (Patent No. 1,511,238, of October 14, 1924).

In practicing the invention according to the specific apparatus illustrated herein the material to be treated will ordinarily be in small units, such as the various grains and sliced or chopped fruits and vegetables, the size of the individual parts or particles being such as to provide for their ready introduction into and removal from the treating receptacles as a continously-moving mass.

The particular form of apparatus illustrated is well adapted to the treatment of a considerable variety of substances, for instance the steeping of corn, the extraction of sugar juice from beets, etc., for the washing of black ash in the soda industry, for the extraction of oil from seeds and other materials, and for other purposes where such actions as washing, leaching, steeping, softening or extracting, etc. take place.

As an indication of important objects and advantages of these improvements they may be compared briefly with some practices heretofore known.

For instance corn to be used for the manufacture of starch and glucose has heretofore been steeped or softened in large vats or tanks, either open or closed, in a solution of sulphurous acid. The time required for the treatment ranges from thirty-six to seventy-two hours, depending upon the hardness of the corn, the temperature of the liquid and the softness desired. This prior and ordinary method of steeping or softening the corn has many objectionable features, such as the time element involved, the use of sulphurous acid as a preservative during the long steeping period, the effect of such acid on the health of employees, the necessity of neutralizing the acid if certain products are to be saved, the large amount of solid matter broken down and lost through the long soaking in the acid solution, the development of bacteria, organic acids, etc. detrimental to the process, the relatively large volume of corn undergoing treatment at a given time and the relatively large amount of capital rendered idle thereby, the large amount of building space required for the many steeping tanks involved, and the cost of upkeep, for labor and for material.

In the glucose and starch industry the present improvements in the form shown in the accompanying drawings will result, among other advantages, in decreasing the time of steeping from the above-mentioned period of thirty-six to seventy-two hours to a maximum of four hours; the amount of space required for treating an equal volume of corn in the present apparatus compared with the old will vary from say one to four to say one to eight; the volume of corn being treated at any given time will be only about fifteen per cent of that according to the old method and apparatus; the new apparatus will extract a higher percentage of the soluble matter contained in the corn, and a higher percentage of solids will also be obtained; and since the spent steep waters are concentrated and the product used as a cattle feed the cost of lime for neutralizing the sulphurous acid solution is avoided according to these improvements, and the cost of the acid is also saved, the resulting cattle feed being also of a higher quality.

In the beet sugar industry sugar is extracted from chipped beets in an apparatus commonly called a diffusion battery, usually composed of ten cells or tanks having perforated bottoms respectively, the tanks being filled with the chipped beets and water being circulated through the tanks from one to the other in series. That process of extraction is a long and tedious one involving considerable expense in equipment, labor and upkeep. The new apparatus illustrated and described herein operates in lieu of such diffusion battery with the material passing continuously through the single unit, to the saving of much time, space and various items of expense, and providing also a more complete extraction of the sugar content.

In view of the disclosure herein made anyone skilled in the art will be able to use the device for treating various other materials and for other purposes to advantageous results.

From the foregoing outline such general objects of these improvements may be stated as the saving of time, space, cost of labor, material and upkeep, and the provision of better results. Other objects and advantages will appear hereinafter.

These and such objects are realized in the provision of methods and means for treating the material as a continuous operation, and in most cases with a partial vacuum acting upon the material as it moves through the treating receptacle, thereby providing for a thorough penetration of the material and action upon it by the treating liquid in a relatively short space of time, the shortening of the time element rendering the use of a preservative, as sulphurous acid, unnecessary.

In the accompanying drawings, which form a part of this specification, the figures are shown in medial vertical section, with a few of the structure parts shown in full. Figure 1 shows a preferred embodiment of a device for carrying out the present invention; Figs. 2 and 3 are fragmentary views showing modifications respectively of the lower part of the device of Fig. 1. It is to be understood that for the purposes of this explanation the upper portions of Figs. 2 and 3 (not shown) are in accordance with the upper portions of Fig. 1.

Referring to Fig. 1 the treating receptacle 10 is a vertically-disposed tubular member which may be formed sectionally of cast or rolled iron or which may be of wood. In practice, for a high rate of production, it may be from thirty to forty feet in height or more, but the height and other proportions may vary within wide limits. Since it may be used for treating grains and other materials which swell when soaked in liquid the receptacle 10 preferably widens toward the bottom to provide additional space for the swelled material. The receptacle 10 and all of the other parts illustrated are to be understood as being supported in their operative positions by any suitable structures suggested by ordinary engineering and do not need to be shown.

The lower end of the receptacle 10 is open at 11, and surrounding this lower open end is an auxiliary receptacle 12 spaced laterally from the lower end of the receptacle 10, the receptacle 12 being open to the outer air at its top at 13 and having a conical bottom portion 12$^a$, the lower end of which may be closed or opened by the valve 14. The trap receptacle 12 is shown as being widened or enlarged at 12$^b$ to accommodate the float valve 15 on the pipe 16 communicating with the tank 17 fragmentarily shown. A conically shaped member 18 supported by stays 19 projects upward and constitutes means for overcoming a chiefly-central downward movement of the material at that place.

At 20 the receptacle 10 is enlarged to accommodate a foraminous almost-cylindrical strainer 21 while providing a space between the strainer ring and the outer wall at 20. From this space a pipe 22 issues and projects downward into the trap tank 23 having an overflow pipe 24.

The material is introduced into the receptacle 10 preferably by means which do not introduce also a substantial amount of outer air, and such means are especially desirable where the upper portion of the treating receptacle is under partial vacuum. In my co-pending application filed September 22, 1922 and known as Serial No. 589,955, to which reference may be had, I have shown several forms of novel devices for introducing material free from air into a treating receptacle, and one of the forms herein shown is substantially illustrated herein at the upper portion of Fig. 1.

The material to be introduced is conducted through the pipe 25 into the hopper 26, and a supply of liquid, for instance water, is fed into the hopper 26 through pipe 27 or pipe 28 simultaneously with the feeding thereinto of the material, whereby the material in the hopper 26, at least the lower portion of the mass therein, is covered by the liquid and the air between the particles or parts of the material is thereby excluded. The material then passes through the valve 29 into a substantially air tight separating chamber 30, formed of sheet metal which opens into the upper portion of the receptacle 10 through the channel 31. A cylindrical screen device 32, of well-known form, is mounted on a shaft 33, and means such as the gear 34 are provided for rotating the screen 32. The pipe 33$^a$ leading from the valve 29 and projecting into the separating chamber 30 conducts the material into the upper end portion of the screen device 32, and as this screen rotates the material gradually works to the lower end of the screen and is discharged through the passageway 31 into the receptacle 10. The baffle 34 is adapted to prevent such material from entering the pipe 35, which may be considered as leading to means for exhausting the air in the upper portion of the tank 10 and producing a partial vacuum therein. The check valve 36 is adapted to provide against loss of vacuum by back flow through the pipe 35. The water introduced with material falls through the screen 32 upon the downwardly-inclined bottom 37, from which it way be drawn through the pipe 38 by the pump 39 and forced through the pipe 27 back to the hopper 26, or the valve 40 may be closed and the valve 41 opened and thereupon the liquid introduced with the material may flow downward through the pipe 42 and be discharged into the collecting tank 43, from which it may be drawn by the pump 44 and forced through the pipe 45 and discharged into the trap receptacle 12. When the liquid is thus conducted from the separating chamber to the trap receptacle 12 the liquid introduced with the material will preferably be the treating liquid, in which case the supply of liquid to be introduced with the material through the pipe 28 will also be the treating liquid. By using the treating liquid from the beginning of operations the treating process is rendered somewhat more rapid.

In treating material according to the device illustrated a supply of the material may be continuously fed into the device notwithstanding the fact that the upper portion of the receptacle 10 may be under partial vacuum, and the treated material may continuously be discharged at the bottom through the valve 14 upon the downwardly-inclined screen 47 from which it passes into the collecting receptacle 48, while the treating liquid which also issues through the valve 14 falls downward into the open-top receptacle 43 and may be conveyed back through the pipe 45 for further use.

In beginning operations the receptacle 10 is first substantially completely filled with the material to be treated, say up to the glass window 48, the material also occupying the conically-shaped portion 12ª of the trap receptacle 12. This initial filling of the tank 10 may be done with the material in its dry state. A quantity of the treating liquid is then introduced in the trap receptacle 12 so as to seal the opening 11 at the bottom of the tank 10. The vacuum device is then put into operation and the receptacle 10 put under partial vacuum. This raises the treating liquid in the receptacle 10 until it reaches the pipe 22, additional treating liquid being supplied the while so as to maintain the seal at the bottom of the tank 10. For maintaining the supply of treating liquid in the trap 12 a supply of the liquid is maintained in the tank 17 and is automatically admitted into the trap 12 through the action of the float valve 15. At all times during the operation of the device the float valve 15 operates to maintain the surface of the treating liquid in the trap 12 at a predetermined height well above the open end 11 of the receptacle 10.

Since the valve 22ª in the pipe 22 is below the plane of the surface of the liquid in the trap 12, when the valve 22ª is opened liquid which has been drawn by suction to the height of the pipe 22 where it enters the receptacle 10 will be siphoned away, and this overflow automatically maintains the level of the liquid in the receptacle 10 at about the discharge opening at 50. The treating liquid drawn off through the pipe 22 may contain valuable substances extracted from the material, for instance sugar in case the material being treated is beets, and this valuable liquor is conducted away for further treatment as may be desired through the overflow pipe 24.

When the valve 14 at the bottom of the trap device is opened and material is constantly being introduced at the top of the receptacle 10 there is a continuous movement of the material downward within the treating chamber. This downwardly-moving mass is first subjected to the action of the partial vacuum so long as the material is above say the discharge opening at 50. The partial vacuum exhausts much of the air from among the cells and fibers or interstices of the material and when the material then sinks into the body of the treating liquid the liquid fills the spaces formerly occupied by the air in the material and the treatment of the material is therefore rendered much more thorough and rapid.

At the same time that the mass of material is moving downward there is a current of treating liquid flowing upward in the receptacle 10, the effect of the current flow being to bring additional treating liquid constantly into association with the material and to carry away liquid which may have become inert in particular instances or which may contain valuable substances to be recovered.

The valve 22ª controlling the outflow may be used for controlling the degree of vacuum in the receptacle 10, and by permitting but a limited flow therethrough the body of liquid in the receptacle 10 may be raised considerably above the discharge opening at 50, which means that the material above the liquid line is subjected to a greater degree of vacuum. By maintaining the surface of the liquid in the trap 12 at a greater elevation than that shown the degree of partial vacuum in the device may be reduced.

While the use of partial vacuum provides an important advantage in lessening the time of treatment as well as in providing a more thorough treatment of the material the construction substantially as shown for the treating receptacle 10 and the trap member 12 may be used without vacuum and without introducing the material substantially free from outer air, in which case the material might be continuously fed into the receptacle and continuously withdrawn therefrom after passing through such a body of the treating liquid as may be contained by the trap receptacle 12, the relative height of this trap receptacle determining the distance through which the material would pass while surrounded by the treating liquid. Liquid current within the treating receptacle could be caused otherwise than by vacuum.

Turning now to Fig. 2 the treating receptacle 55 has its lower portion conically shaped and terminates in an outlet valve 56 through which the material may be discharged upon the screen 57 and thence into the collecting receptacle 58 while the treating liquid falls into the tank 59 from which it may be discharged by the pipe 60, pump 61 and pipe 62 into the trap tank 63 in communication through the pipe 64 with the enlargement 65 of the tank 55. The screen device 66 provides an annular open space 67 between it and the walls 65. A supply tank 67ª cooperates with the supply from the pipe 62 to maintain a constant level of liquid in the tank 63 through the operation of the float-controlled valve 68. As already stated the parts shown in Fig. 2 may be considered merely as a modification of the lower parts of Fig. 1 and we will therefore assume that the material is constantly being introduced into the tank 55 and that the action of the vacuum is to draw the treating liquid from the tank 63 upward among the particles of the material and that such treating liquid is discharged through a pipe as 22 of Fig. 1.

According to Fig. 3 the material is withdrawn from the treating tank 70 by a spiral conveyor 71, the upper or discharge end of which is above the liquid level, say where the discharge pipe 72 enters the tank 70. The supply tank 73 conveys a supply of treating liquid through the pipe 74 to the lower portion of the tank 70, which treating liquid is drawn upward by the vacuum when the vacuum feature is used. Since the supply tank 73 is above the discharge pipe 72 where it enters the tank an upward flow of treating liquid may be had in the tank 70 without the use of the vacuum.

It will be evident to those skilled in the art that various changes and departures may be made within the scope of these improvements from what is herein specifically illustrated and described, and reference should therefore be had to the appended claims to determine what is included within the invention herein set forth.

I claim:

1. In a treating device, the combination of a substantially vertically disposed treating receptacle, means for continuously feeding material to be treated into the upper portion of the receptacle, means for continuously withdrawing treated material from the lower portion of the receptacle, means for introducing a treating liquid into the receptacle, means for inducing a partial vacuum in the upper portion of the receptacle, and means for discharging such liquid from the receptacle at a predetermined height therein which is at a material distance below the place where the material is fed into the receptacle.

2. In a treating device, the combination of means forming a treating receptacle including a substantially vertically arranged tubular member, means forming a liquid trap at the bottom portion of said tubular member, means for feeding material to be treated into the upper portion of the receptacle, means for withdrawing treated material from the lower portion of the receptacle, means for introducing a treating liquid into the receptacle, and means for discharging such liquid from the receptacle at a predetermined height therein.

3. In a treating device, the combination of means forming a treating receptacle including a substantially vertically arranged tubular member, means forming a liquid trap in communication with the lower portion of said tubular member, means for feeding material to be treated into the upper portion of the receptacle, means for withdrawing treated material from the lower portion of the receptacle, means for introducing a treating liquid into the receptacle, means for inducing a partial vacuum in the upper portion of the receptacle, and means for discharging such liquid from the receptacle at a predetermined height therein.

4. In a treating device, the combination of means forming a treating receptacle including a substantially vertically arranged tubular member which gradually widens throughout a portion thereof as it extends downward and which is open at the bottom, the receptacle including means forming a liquid trap at the bottom of said tubular member, means for feeding material to be treated into the upper portion of the receptacle, means for withdrawing treated material from the lower portion of the receptacle, means for introducing a treating liquid into the receptacle, and means for discharging such liquid from the receptacle at a predetermined height therein.

5. In a treating device, the combination of means forming a treating receptacle including a substantially vertically arranged tubular member which gradually widens throughout a portion thereof as it extends downward and which is open at the bottom, the receptacle including means forming a liquid trap at the bottom of said tubular member, means for continuously feeding material to be treated into the upper portion of the receptacle, means for continuously withdrawing treated material from the lower portion of the receptacle, means for continuously introducing a treating liquid into the receptacle, means for continuously inducing a partial vacuum in the upper portion of the receptacle, and means for discharging such liquid from the receptacle at a height therein to which such liquid is raised by such partial vacuum.

6. In a treating device, the combination of a downwardly-extending upper receptacle part open at the bottom, an upwardly extending lower receptacle part open at the top, the open top portion of the lower receptacle part encompassing and extending upward beyond and in spaced relation to the open bottom portion of the upper receptacle part, means for introducing into the upper receptacle part material to be treated, means for supplying liquid to the receptacle so as to cover the open lower end portion of the upper receptacle part to form a liquid trap, means for inducing a partial vacuum in the upper receptacle part when the device is normally in use, and means for withdrawing material from the lower receptacle part.

7. In a treating device, the combination of a downwardly-extending upper receptacle part open at the bottom, an upwardly extending lower receptacle part open at the top, the open top portion of the lower receptacle part encompassing and extending upward beyond and in spaced relation to the open bottom portion of the upper receptacle part, means for introducing into the upper receptacle part material to be treated, means for supplying liquid to the receptacle so as to cover the open lower end portion of the upper receptacle part, means for inducing a partial vacuum in the upper receptacle part, and means for withdrawing material from the lower receptacle part.

8. In a treating device, the combination of a downwardly-extending upper receptacle part open at the bottom, an upwardly extending lower receptacle part open at the top, the open top portion of the lower receptacle part encompassing and extending upward beyond and in spaced relation to the open bottom portion of the upper receptacle part, means for introducing into the upper receptacle part material to be treated, means for supplying liquid to the lower receptacle part so as to cover the open lower end portion of the upper receptacle part, means for inducing a partial vacuum in the upper receptacle part adapted to raise the upper surface of such liquid in the upper receptacle part, means for drawing off such liquid at a predetermined height in the upper receptacle part, and means for withdrawing material from the lower receptacle part.

9. In a treating device, the combination of a downwardly-extending upper receptacle part open at the bottom, an upwardly extending lower receptacle part open at the top, the open top portion of the lower receptacle part encompassing and extending upward beyond and in spaced relation to the open bottom portion of the upper receptacle part, means for introducing into the upper receptacle part material to be treated, means for supplying liquid to the lower receptacle part so as to cover the open lower end portion of the upper receptacle part, means for inducing a partial vacuum in the upper receptacle part adapted to raise the upper surface of such liquid in the upper receptacle part, means including means for discharging liquid from the upper receptacle part for varying the degree of partial vacuum in the receptacle, and means for withdrawing material from the lower receptacle part.

PHILIP A. SINGER.